June 25, 1957 W. J. SPRAU 2,796,809
PULP SCREENING APPARATUS
Filed July 6, 1954 3 Sheets-Sheet 1

INVENTOR
William J. Sprau
BY Robert F. Hause
ATTORNEY

United States Patent Office 2,796,809
Patented June 25, 1957

2,796,809

PULP SCREENING APPARATUS

William J. Sprau, Orchard Park, N. Y., assignor to National Gypsum Company, Buffalo, N. Y., a corporation of Delaware Application July 6, 1954, Serial No. 441,563

3 Claims. (Cl. 92—34)

This invention relates to filtering or screening wood fibers, or pulp and especially to an improved method and means for screening a pulp slurry to provide a slurry of desired maximum particle size.

In many processes involving pulp fibers, a liquid solution or slurry of fibers is prepared containing fibers of a size greater than desired intermixed with fibers suitably reduced, in particle-size, below the maximum particle-size allowable. A method presently preferred in the art for providing this screening consists of urging, substantially constantly, a pulp solution through a screen of a proper mesh, and periodically reversing the direction of the flow. This creates a momentary liquid flow from the filtered to the unfiltered side of the screen to remove oversized fibers which tend to cling to and clot the screen. The oversized fibers are, then, urged to pass on to a reject outlet on the unfiltered side of the screen to be returned to the pulp shredder. One method of providing the periodic reversal of liquid flow is the movement of a paddle, having an extent parallel to the screen, in a direction generally perpendicular to the extent of the paddle and parallel to the screen, and along the surface of the filtered side of the screen. The paddle movement creates a pressure zone in advance of the paddle, causing a consequent liquid movement back through the screen in the direction reverse of the normal liquid flow.

It will be readily apparent that the paddle method of reversing flow, as well as most any other method of reversing flow, will cause some fibers of the desirable small particle-size, which have previously passed through the screen, as desired, to pass back through the screen, as would not be desired. The existence of such a condition obviously reduces the efficiency of the apparatus and creates what could be termed wasted work. No practical, commercial screening apparatus will pass one-hundred percent of the fibers properly reduced in size and reject all over-size fibers and, thus, improvements in efficiency are constantly strived for.

It is, therefore, an object of this invention to provide a means and method of periodically reversing the flow through a pulp screen to avoid clogging of the interstices, which means and method avoid or substantially reduce the return of properly screened fibers to the unfiltered side of the screen. Briefly, this is accomplished by providing a source of fresh or white water adjacent the filtered side of the screen at the proper time and place whereat a reversal of flow is to occur, so that a relatively fiber-free liquid passes back through the screen to accomplish the necessary cleaning of the screen.

Another object of the invention is to provide a novel apparatus for providing a pressure zone on the filtered side and simultaneously direct a fiber-free liquid under pressure into the pressure zone to provide a relatively fiber-free liquid for unclogging the screen.

These and other objects will be more apparent when considered in connection with the following detailed description of a preferred embodiment of the invention and the accompanying drawings in which.

Figure 1:
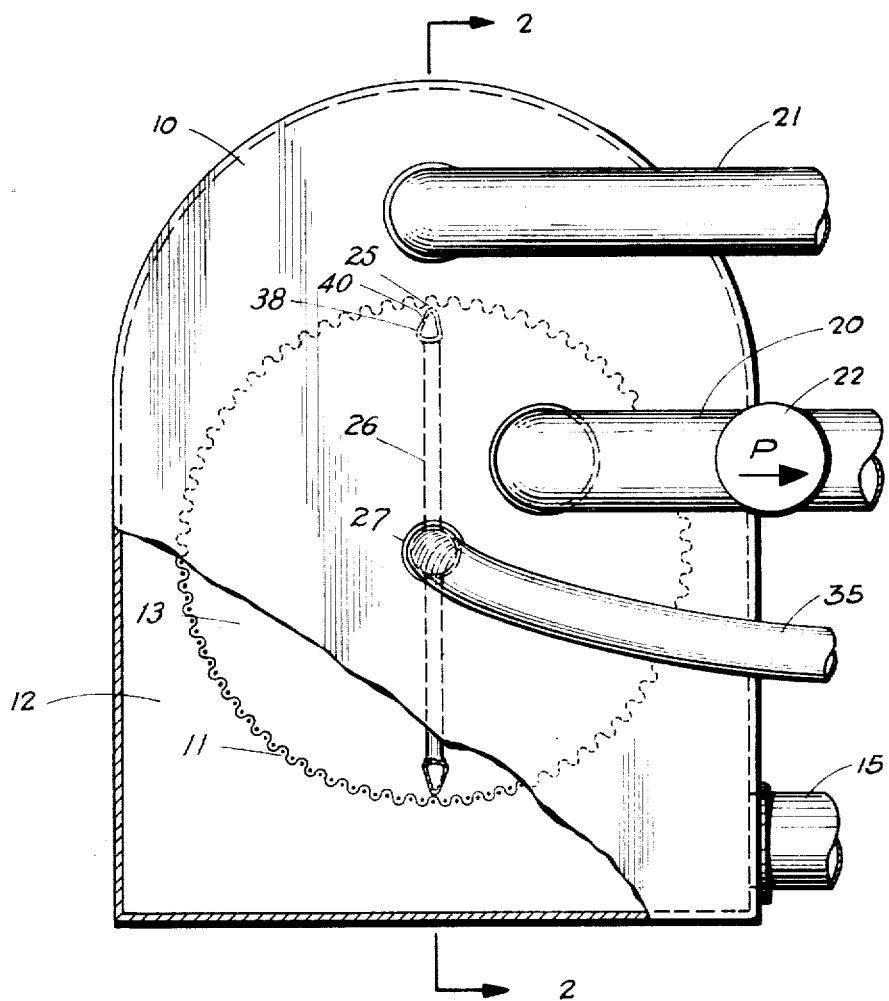
Fig. 1 is an end view of a pulp screening apparatus embodying the present invention, portions being broken away.
Figure 2:
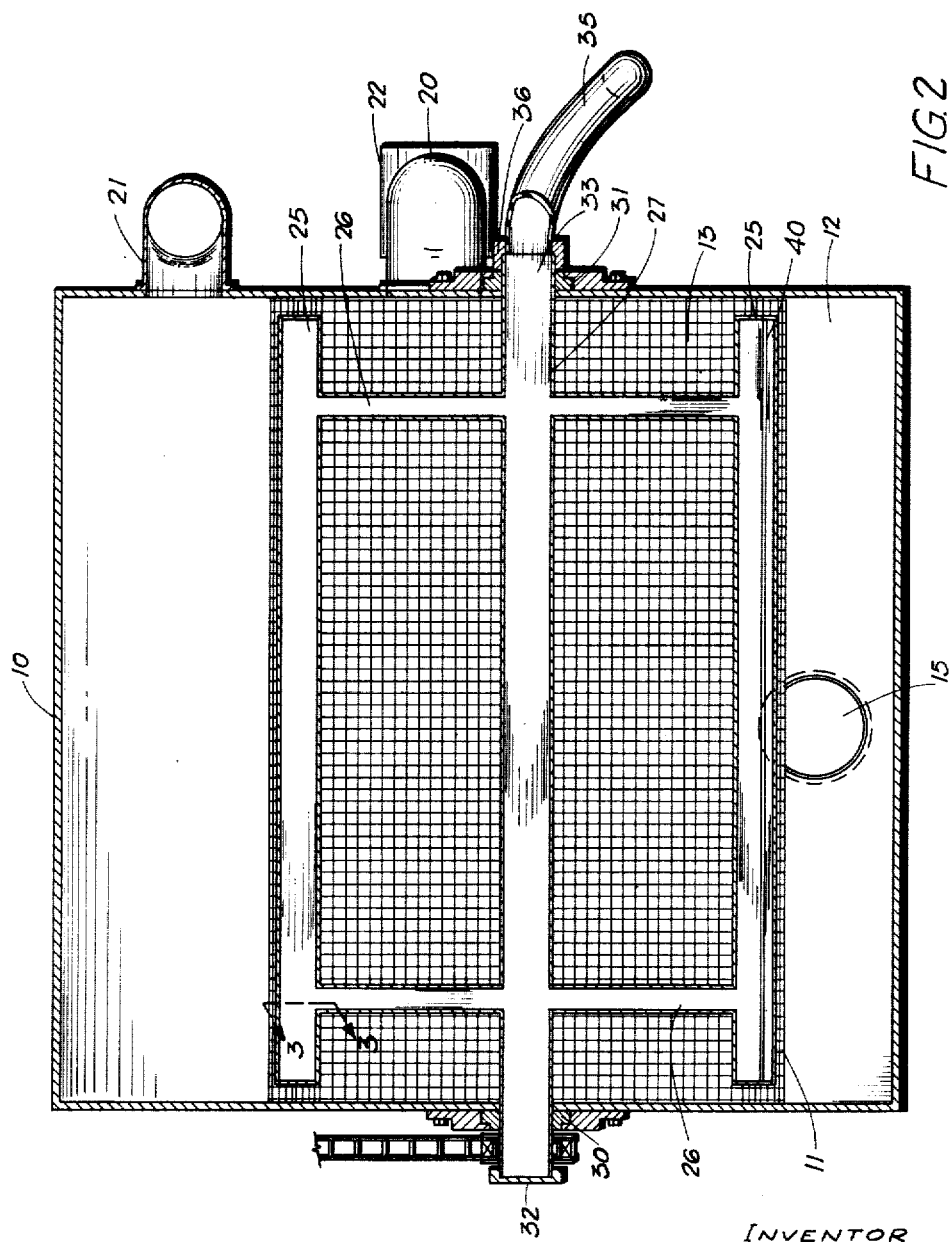
Fig. 2 is a front sectional view of the apparatus of Fig. 1 taken on line 2—2.

In the several figures of the drawings, like characters of reference denote like parts and the numeral 10 designates one form of a pulp screening apparatus having a fixed cylindrical screen 11 therein dividing the interior of the apparatus 10 generally into an unfiltered pulp portion 12 and a filtered pulp portion 13. Pulp stock, finely divided and in slurry form, enters the unfiltered portion 12 of apparatus 10 through inlet pipe 15 and is maintained at a liquid level above the maximum vertical extent of screen 11.

A filtered material outlet pipe 20 opens into one end face of apparatus 10 within the filtered portion 13 and a reject material outlet pipe 21 opens into an end face of apparatus 10 within the unfiltered portion 12. Reject pipe 21 will ordinarily open into the upper portion or be otherwise formed to provide the means for maintaining the desired liquid level in apparatus 10. A suction pump 22 in pipe 20 provides a relatively greater flow through filtered material pipe 20 in comparison to flow through reject pipe 21, as is explained hereinafter.

One or more generally hollow elongate paddles 25 are held in close proximity to and extend along and closely adjacent to screen 11 on the filtered side thereof. Paddles 25 are movable relative to and along the surface of screen 11 in a direction generally perpendicular to the lengthwise direction of paddles 25. In the preferred embodiment with a cylindrical screen, as shown, paddles 25 are affixed to hollow, radially extending arms 26 which extend from a hollow shaft 27, coaxial with the cylindrical screen 11. Shaft 27, rotatably mounted in opposite bearings 30, 31 at opposite end faces of apparatus 10, is sealed closed at one end 32 and opens at end 33 into a fresh or white water supply hose 35, connected thereto by a suitable mill T rotatable coupling 36. The hose 35, hollow shaft 27 and hollow arms 26 form continuous conduits for supplying fresh or white water to the hollow paddles 25.

Figure 3:
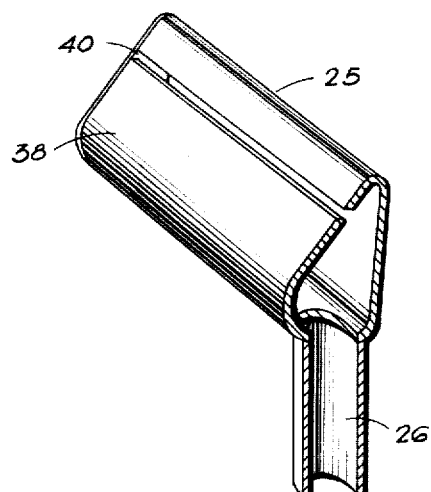
Fig. 3 is an end sectional view of the paddle portion of the apparatus of Fig. 2 taken on line 3—3.
Figure 4:
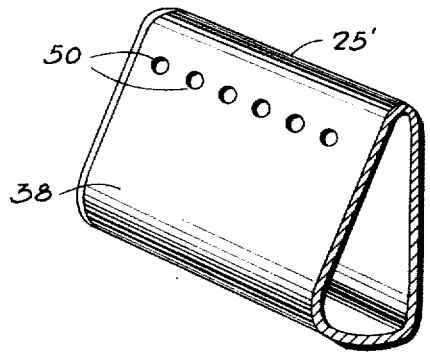
Fig. 4 is a view, similar to Fig. 3, of a modification of the invention.

Paddles 25 are formed in a generally ovular cross section, with a leading face 38 inclined in the order of 15° to the radii. Either one narrow, elongate, fresh or white water outlet 40 (Fig. 3) or a plurality of outlets 50, 50 (Fig. 4) are disposed along the extent of leading face 38 to discharge fresh or white water continuously throughout a zone immediately in advance of the rotating paddles, as is discussed further hereinafter.

The slurry fed through inlet pipe 15 contains finely divided pulp fibers of widely varying particle size, of which only particles smaller than a given intermediate size are acceptable for subsequent operations following the screening step. The purpose of apparatus 10 is, as indicated above, to filter and separate the acceptable, suitably fine, particles or fibers from the unacceptable, coarser or oversize particles or fibers, by means of screen 11. The slurry, as fed into apparatus 10, receives a greater urging to flow through screen 11 by the provision of means for discharging a major portion of the slurry liquid and contents through a filtered material outlet pipe 20 and means for discharging rejected material also in slurry form at a substantially slower rate through a reject material outlet pipe 21. The suction pump 22 drawing material from pipe 20, and the lack of a pump in pipe 21, provides the desired tendency for as great a percentage of properly sized material to flow through the screen as can be obtained efficiently. It will be readily apparent that the efficiency could not be maintained commercially and economically at one-hundred percent.

It will also be apparent that continuous operation, without means for screen cleaning, would cause a continual build-up of a film of oversized material on the unfiltered side of the screen 11, until such time that flow through the screen is substantially prohibited. The provision of an intermittent reverse flow through the screen 11 is known to be suitable to avoid the build-up of such a film, by causing the oversized fibers adjacent the screen surface to be disrupted away into dispersion in the feed slurry to be carried away in the slurry rejected through pipe 21.

In accordance with the invention, the abovesaid intermittent reverse flow is created by paddles 25 passing along the filtered side of screen 11. The content movement of paddles 25, at a substantial velocity, creates a zone immediately forward of the paddles 25 wherein the slurry might be described as being under a relatively higher pressure or as being caused to move away from the path of the paddle. Since the path of the paddle is immediately adjacent the filtered side of the screen 11, the effect of the paddle is such that with a properly slanted face 38, substantially all of the solution in advance thereof, which is to be displaced by the paddle, will flow through the screen 11 in a direction reverse of normal flow of the slurry through the screen. This action is known to provide the desired cleaning of the opposite side of the screen.

In accordance with the invention, a continuous supply of fresh water, or other liquid relatively free of pulp, is discharged from outlets 40, constantly creating a zone of liquid, substantially free of filtered acceptable pulp, in advance of the motion of the paddles.

Thus, it will be recognized that the solution forward of the paddle which is described above as being caused by movement of the paddle to flow through the screen in a reverse direction will be substantially pulp-free liquid. By providing the zone of fresh or white water for the above reverse flow, substantially no filtered and acceptable pulp will be forced to return to the unfiltered portion to be undesirably rejected, as has been known to occur in prior related screening apparatus. A consequent decrease in the amount of loss to the reject outlet of desirably fine-sized pulp is inevitable by the use of the novel clear liquid solution for the reverse flow screen cleaning operation.

Having completed a detailed disclosure of preferred embodiments of my invention so that those skilled in the art may practice the same, I contemplate that variations may be made without departing from the essence of the invention or the scope of the appended claims.

I claim:

1. Apparatus for screening wood pulp slurry comprising a compartment, a submerged screen of preselected mesh to pass a pulp slurry of predetermined maximum particle size disposed in said compartment and dividing the same into an inlet and an outlet chamber, means for educting acceptable, filtered slurry from said outlet chamber, means for educting rejected slurry from said inlet chamber, means for continuously supplying pulp slurry into said inlet chamber for effecting a continuous flow of slurry through said screen, and means for cleaning rejected pulp material from the inlet side of said screen, the last mentioned means comprising an elongate paddle disposed in said outlet chamber and mounted in close adjacency to the outlet side of said screen for sweeping movement thereacross, said paddle having a forward face defining substantially an acute angle with respect to said outlet side of the screen to provide a pocket therewith, means for introducing and maintaining a zone of pulp-free liquid immediately adjacent said forward face of the paddle within said pocket, and means for moving said paddle to sweep across the outlet side of said screen such that the forward face of said paddle forces the pulp-free liquid through said screen from the outlet to the inlet side thereof to dislodge rejected pulp particles from the inlet side of the screen.

2. Apparatus for screening wood pulp slurry comprising a compartment, a submerged screen of preselected mesh to pass a pulp slurry of predetermined maximum particle size disposed in said compartment and dividing the same into an inlet and an outlet chamber, means for educting acceptable, filtered slurry from said outlet chamber, means for educting rejected slurry from said inlet chamber, means for continuously supplying pulp slurry into said inlet chamber for effecting a continuous flow of slurry through said screen, and means for cleaning rejected pulp material from the inlet side of said screen, the last mentioned means comprising an elongate paddle disposed in said outlet chamber and mounted in close adjacency to the outlet side of said screen for sweeping movement thereacross, said paddle having a forward face defining substantially an acute angle with respect to said outlet side of the screen to provide a pocket therewith, said forward face of the paddle being provided with a plurality of apertures longitudinally therealong, means for discharging pulp-free liquid through said apertures for introducing and maintaining a zone of pulp-free liquid immediately adjacent said forward face of the paddle within said pocket, and means for moving said paddle to sweep across the outlet side of said screen such that the forward face of said paddle forces the pulp-free liquid through said screen from the outlet to the inlet side thereof to dislodge rejected pulp particles from the inlet side of the screen.

3. Apparatus for screening wood pulp slurry comprising a compartment, a submerged screen of preselected mesh to pass a pulp slurry of predetermined maximum particle size disposed in said compartment and dividing the same into an inlet and an outlet chamber, means for educting acceptable, filtered slurry from said outlet chamber, means for educting rejected slurry from said inlet chamber, means for continuously supplying pulp slurry into said inlet chamber for effecting a continuous flow of slurry through said screen, and means for cleaning rejected pulp material from the inlet side of said screen, the last mentioned means comprising an elongate paddle disposed in said outlet chamber and mounted in close adjacency to the outlet side of said screen for sweeping movement thereacross, said paddle having a forward face defining substantially an acute angle with respect to said outlet side of the screen to provide a pocket therewith, said forward face of the paddle having a longitudinally extending slot therein for introducing and maintaining a zone of pulp-free liquid immediately adjacent said forward face of the paddle within said pocket, and means for moving said paddle to sweep across the outlet side of said screen such that the forward face of said paddle forces the pulp-free liquid through said screen from the outlet to the inlet side thereof to dislodge rejected pulp particles from the inlet side of the screen.

References Cited in the file of this patent

UNITED STATES PATENTS

| 310,469 | Schlatter | Jan. 6, 1885 |
|---|---|---|
| 1,990,992 | Lang | Feb. 12, 1935 |
| 1,993,214 | Hass | Mar. 5, 1935 |
| 2,685,235 | Lindblad | Aug. 3, 1954 |

FOREIGN PATENTS

| 24,570 | Sweden | Aug. 26, 1907 |

UNITED STATES PATENT OFFICE

CERTIFICATE OF CORRECTION

Patent No. 2,796,809                               June 25, 1957

William J. Sprau

It is hereby certified that error appears in the printed specification of the above numbered patent requiring correction and that the said Letters Patent should read as corrected below.

Column 3, line 17, for "content" read --constant--.

Signed and sealed this 20th day of August 1957.

(SEAL)
Attest:
KARL H. AXLINE

Attesting Officer

ROBERT C. WATSON
Commissioner of Patents